(12) United States Patent
Nakagawa

(10) Patent No.: US 7,359,673 B2
(45) Date of Patent: Apr. 15, 2008

(54) UWB REPEATER WITH PULSE DELAY AND UWB COMMUNICATION SYSTEM

(75) Inventor: Masao Nakagawa, Tokyo (JP)

(73) Assignee: Keio University, Tokyo (JP)

( * ) Notice: Subject to any disclaimer, the term of this patent is extended or adjusted under 35 U.S.C. 154(b) by 617 days.

(21) Appl. No.: 10/719,028

(22) Filed: Nov. 24, 2003

(65) Prior Publication Data
US 2004/0157550 A1    Aug. 12, 2004

(30) Foreign Application Priority Data
Nov. 25, 2002    (JP) .............................. 2002-341499

(51) Int. Cl.
*H04B 7/15*     (2006.01)
*H04B 7/14*     (2006.01)
*H04B 7/19*     (2006.01)

(52) U.S. Cl. ........................ 455/11.1; 455/7; 455/13.2

(58) Field of Classification Search .............. 455/11.1, 455/7, 9, 10, 16; 375/211, 130
See application file for complete search history.

(56) References Cited

U.S. PATENT DOCUMENTS

| | | | |
|---|---|---|---|
| 6,108,364 A * | 8/2000 | Weaver et al. ............... | 375/130 |
| 6,670,909 B2 * | 12/2003 | Kim ............................. | 342/50 |
| 7,079,604 B1 * | 7/2006 | Miller et al. ................. | 375/343 |
| 7,113,742 B2 * | 9/2006 | Kindo et al. ................. | 455/11.1 |
| 2004/0002346 A1 * | 1/2004 | Santhoff .................... | 455/456.1 |
| 2004/0109506 A1 * | 6/2004 | Hinton et al. ............... | 375/242 |
| 2005/0042999 A1 * | 2/2005 | Rappaport ................... | 455/307 |

FOREIGN PATENT DOCUMENTS

| | | |
|---|---|---|
| JP | 49/111502 | 10/1974 |
| JP | 60-235536 | 11/1985 |
| JP | 04/077017 | 3/1992 |
| JP | 2000-502218 | 2/2000 |
| JP | 2002-335568 | 11/2002 |
| WO | WO97/08854 | 3/1997 |
| WO | 02/49378 | 6/2002 |

OTHER PUBLICATIONS

Nikkei Electronics, Mar. 11, 2002, pp. 55-66, Japan (Publication date: Mar. 11, 2002).

* cited by examiner

*Primary Examiner*—Tilahun Gesesse
(74) *Attorney, Agent, or Firm*—Edwards Angell Palmer & Dodge LLP

(57) ABSTRACT

A UWB repeater preferably applied to a relay of stream data, which does not require frequency conversion and has less delay in relay. The UWB repeater includes a receiving antenna, a receiver, a transmitter, a transmitting antenna, and a relay controller. The relay controller is provided with a switch unit, a delay, and a transmitting/receiving timing controller. UWB pulse signals demodulated by the receiver are power-amplified by the transmitter and transmitted after being delayed by the delay unit for timing that does not overlap the receiving timing. The transmitting/receiving timing controller turns on the switch unit during the period of pulse receiving timing and enables a relay of the receiving pulses, and turns off the switch unit during the period of relaying of pulses, and can prevent sneak path signals between the transmitting side and the receiving side.

4 Claims, 7 Drawing Sheets

FIG.1
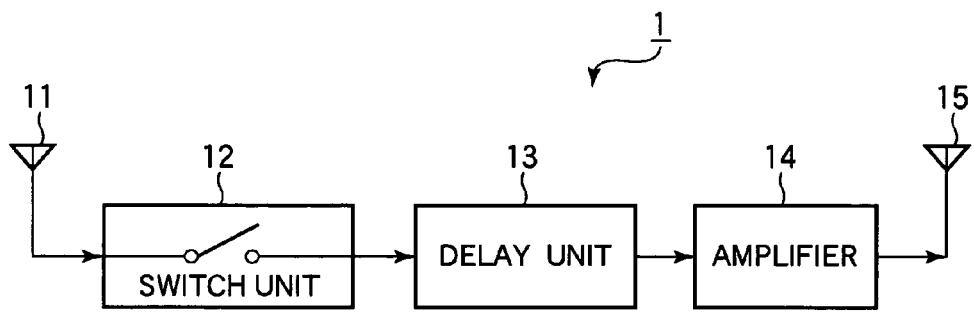
FIG.2A  RECEIVING SIGNAL
FIG.2B  TRANSMITTING SIGNAL
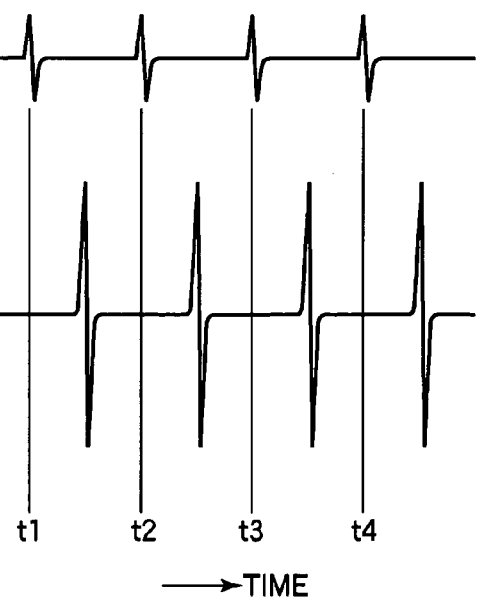
t1  t2  t3  t4
⟶ TIME

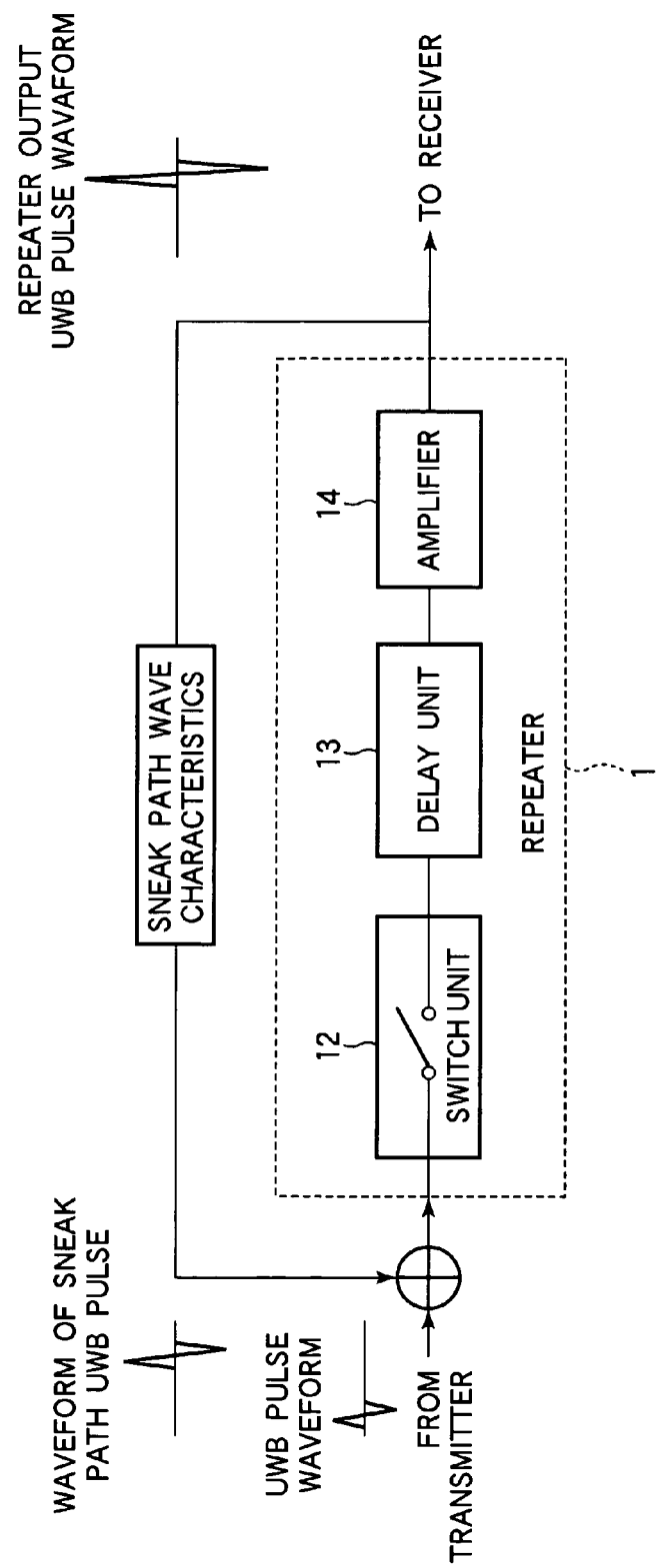

UWB REPEATER WITH PULSE DELAY AND UWB COMMUNICATION SYSTEM

BACKGROUND OF THE INVENTION

1. Field of the Invention

The present invention relates to a UWB (UWB: Ultra Wide Band) repeater for relaying pulse signals of UWB, and a UWB communication system for carrying out bi-directional communications using UWB pulse signals.

2. Description of the Related Art

A UWB wave for carrying out radio communications by radiating steep pulse waveforms in free air has attempted to be used in micro wave bands not only for radio communications but also for measuring with radar, etc. As for the frequency of this communication system, the ratio of the bandwidth to the center frequency (that is, used bandwidth/center frequency) is 20% or more, and a remarkably wide bandwidth is utilized in comparison to a case where the ratio of the bandwidth is several percent even in general wideband radio communication system.

FIG. 7 is a view showing one example of UWB pulse waveforms. When viewing the waveform in timebase, a pulse for transmitting data is steep, and a specified time elapses until the next pulse comes. That is, a pulse series as shown in FIG. 7 is brought about. Thus, it is possible to transmit information containing several bits by the existence and phase of one pulse. In FIG. 7, t1 and t2 indicate the times when a pulse appears. T1 indicates a pulse width.

This results in a frequency band of several GHz where the ratio of the bandwidth in the micro waveband is 20% or more. Although there is a possibility that communications and radar, which have been used conventionally, are subjected to interference by UWB in a bandwidth, other communications are carried out in a narrow bandwidth in comparison to the bandwidth of UWB, wherein it is possible to alleviate influences of UWB by a filter. Although the influences of UWB can be alleviated by a filter, the transmission power of UWB is suppressed to a low level in order to protect existing communications, a transmission range of only several tens of meters can be obtained even in free space.

Because the UWB is a wide bandwidth, although the above-described problems exist, the UWB can handle transmissions whose data rate is 100 Mbps or more. Further, the receiver of the UWB can be simplified because the UWB is not a system for modulating a carrier wave. Therefore, the UWB is in an attempt to widely prevail by virtue of the above reason.

Further, it is described in Non-Patent Document 1 that the UWB is expected as a technology for realizing high-speed radio communications.

DISCUSSION OF PRIOR ART

"NIKKEI ELETRONICS" Edition: Mar. 11, 2002, Pages 55 through 66

In UWB technology, because a remarkably wide bandwidth is utilized, it is required that the frequency is used in common with other communications. Therefore, strict limitations have been applied to transmitting power so that the UWB does not interfere with other transmissions. As a result, the range of UWB signals is limited to a short distance, which may be only several tens of meters in free space. Also, if a wall etc. exists in-between, the UWB signals further attenuate, wherein the range is shortened. Accordingly, although it is greatly advantageous to increase the data rate in the UWB transmission, a disadvantage arises in that the range is limited.

FIG. 8 is a view showing the concept of relaying. The relay is available as a method for preventing the disadvantage which is a short range. The method is based on a system in which a receiver is placed in a range for which signals are accessible by one transmitter, received signals are amplified and transmitted again, and signals are transmitted to a target receiver, wherein the outreach of the signals is thus extended.

In FIG. 8, an example is illustrated, in which radio waves transmitted by a transmitting antenna 101 installed at a transmitting point are received by a receiving antenna 102 at a relaying point, signals received by a repeater (not illustrated) installed at the relaying point are amplified, and are transmitted from a transmitting antenna 103 at the relaying point. A receiving antenna 104 is installed at a receiving point.

Relaying has conventionally been used in radio communications. Between-city telephone network relay utilizing microwave is an example of large-scale relaying. This is a method in which a radio wave is transmitted from a specified city, a repeater is installed at a midpoint between a city and another city, and the radio wave is relayed to the other city.

FIG. 9 is a view showing a frequency-converting repeater. In a repeater, such a method is employed, in which a specified frequency of a received signal is converted to another frequency, then the signal is amplified and transmitted. FIG. 9 shows an example in which a signal of frequency f1 received by a receiving antenna 112 is converted to signal of frequency f2 by a repeater 111 and is transmitted from a transmitting antenna 113.

A reason why the frequency is converted to another frequency is because, if a weak receiving signal is captured by the receiving antenna of a repeater, amplified with the frequency not converted, and is transmitted by a transmitting antenna in a case where the receiving and transmitting frequencies are the same, hang-up such as oscillation of the repeater or interference between codes arises as a result of coupling between the transmitting/receiving antennas that are installed in neighboring space. If radio waves are involved with different frequencies, the leaked radio waves can be eliminated by a filter, wherein no oscillation or deterioration in characteristics occur. By thus converting the frequencies, because almost no delay occurs in relay, the method is suitable for relaying of telephone communications and broadcasting.

On the other hand, a method used for packet communications and an SFN (Single Frequency Network) repeater, which is used for radio relay for digital terrestrial TV broadcasting waves, are available as a method for relaying with the same frequency.

FIG. 10 is a view showing a packet repeater. In the packet communications, a packet transmitted from a radio station is based on a unit time length of several milliseconds and a unit information volume of several hundreds through several thousands of bytes. An address of the packet and information of a transmitting source are housed in the top of the packet and the packets are intermittently transmitted. Therefore, in the repeater, no transmission is carried out while receiving a packet, and the packet is transmitted with the receiving side stopped after the packet is completely accumulated in the repeater. By time-division utilizing the intermittent characteristics of packets, the same frequency may be used. As a drawback, the system cannot be utilized unless sufficient gap is secured between packets. A large delay may arise, which exceeds a packet length of several hundreds of bytes or more.

FIG. 11 is a view showing the SFN repeater. The SFN repeater handles real-time continuous stream contents, in which the transmitting and receiving frequencies of the repeater are made coincident with each other. Although the method seems ideal because its delay is slight in relaying, it is required that the transmitting/receiving antennas are installed apart from each other in order to prevent deterioration in the characteristics due to coupling between the transmitting and receiving of signals, and that a coupling canceller is provided. Finally, it is unavoidable that the space of a repeater is increased, and its structure is made complicated. Therefore, the method is applicable to a repeater where various conditions are satisfied, for example, the transmitting antenna and receiving antenna are installed remotely from each other. However, if conditions are not satisfied, there is no method other than the same conventional analog TV broadcasting wave relaying method, in which relaying is carried out with frequency conversion.

Although it is necessary to provide relaying to extend the range of radio waves as a result of strict limitations in transmission power of UWB, there are various problems if the conventional methods described above are applied as they are.

First, as regards the frequency conversion system, because the ratio of the bandwidth is remarkably wide in UWB, a frequency band is brought about that is completely different from the received frequency if the frequency of received signals is converted. For example, although receiving is based on a microwave band, transmitting will be based on a submillimeter wave band or a millimeter wave band. If such a situation occurs, it becomes necessary to provide antennas of different frequency bands in a repeater, wherein amplifiers and filters at the receiving side differ from those at the transmitting side. Therefore, the economic burden is increased, and because the propagation characteristics of radio waves in different frequencies differ in air space, it becomes difficult to design circuits.

Next, the method for executing packet relay is taken into consideration. From now onward, demand for UWB will develop in applications for radio homelinks, wherein real-time stream-based data transmission will increase, making it difficult to secure sufficient gap between packets. Also, another drawback may arise in that delay in the packet relay may be increased.

Even if it is possible to shorten the distance between the transmitting and receiving sides in the SFN repeater by using a canceller, distance securing between a transmitting antenna and a receiving antenna becomes a hindrance in view of making the repeater compact where homelinks are taken into consideration. Also, because a canceller used for on-ground digital TV broadcasting handles only 6 MHz of the bandwidth of broadcasting waves, that would not apply to GHz in UWB. With the current technology, it is remarkably difficult to secure critical signal processing in UWB with that of the canceller. Accordingly, due to the above-described reason, it can be said that it is difficult to employ the SFN repeater.

SUMMARY OF THE INVENTION

The present invention was developed to solve the above-described problems and shortcomings. It is therefore an object of the invention to provide a repeater suitable for UWB. In greater detail, it is an object of the invention to provide a repeater that is applicable to continuous data streams which are not intermittent, does not require any frequency conversion, and is suitable for UWB.

Further, it is another object of the invention to provide a UWB communication system that is able to execute bi-directional communications with a simple structure by time-sharing transmitting and receiving timings of pulse signals in UWB.

A UWB repeater according to the invention to solve the above-described objects comprises a receiver for receiving pulse signals of UWB, a transmitter for transmitting pulse signals of UWB, and a relay controller for transmitting pulse signals, which are received by the above-described receiver, from the above-described transmitter at a transmitting timing different from the receiving timing by pulse units.

The above-described relay controller includes a delay unit for delaying pulse signals received by the above-described receiver, thereby making the receiving timing different from the transmitting timing.

The above-described relay controller solves sneaked pulse signals relayed and transmitted by a UWB repeater by deactivating the receiving feature of the above-described receiver or causing the output of the receiver not to be supplied to the transmitter in the above-described transmitting timing.

A UWB communication system according to the invention comprises a receiver for receiving pulse signals of UWB, a transmitter for transmitting pulse signals of UWB, and a transmitting timing controller for setting the transmitting timing of pulse signals at the above-described transmitter to a timing different from the receiving timing of pulse signals at the above-described receiver by pulse unit, wherein sneak path wave between the transmitting side and receiving side can be resolved, and it is possible to easily realize a UWB communication system capable of carrying out bi-directional communications.

BRIEF DESCRIPTION OF THE DRAWINGS

FIG. 1 is a view showing the basic configuration (operating principle) of a UWB repeater according to the invention;

FIGS. 2A and 2B are views showing operations of the UWB repeater according to the invention;

FIG. 3 is a view showing actions of resolving sneak path wave between the transmitting side and receiving side of the UWB repeater according to the invention;

DETAILED DESCRIPTION OF THE EXEMPLARY EMBODIMENTS

Figure 4:
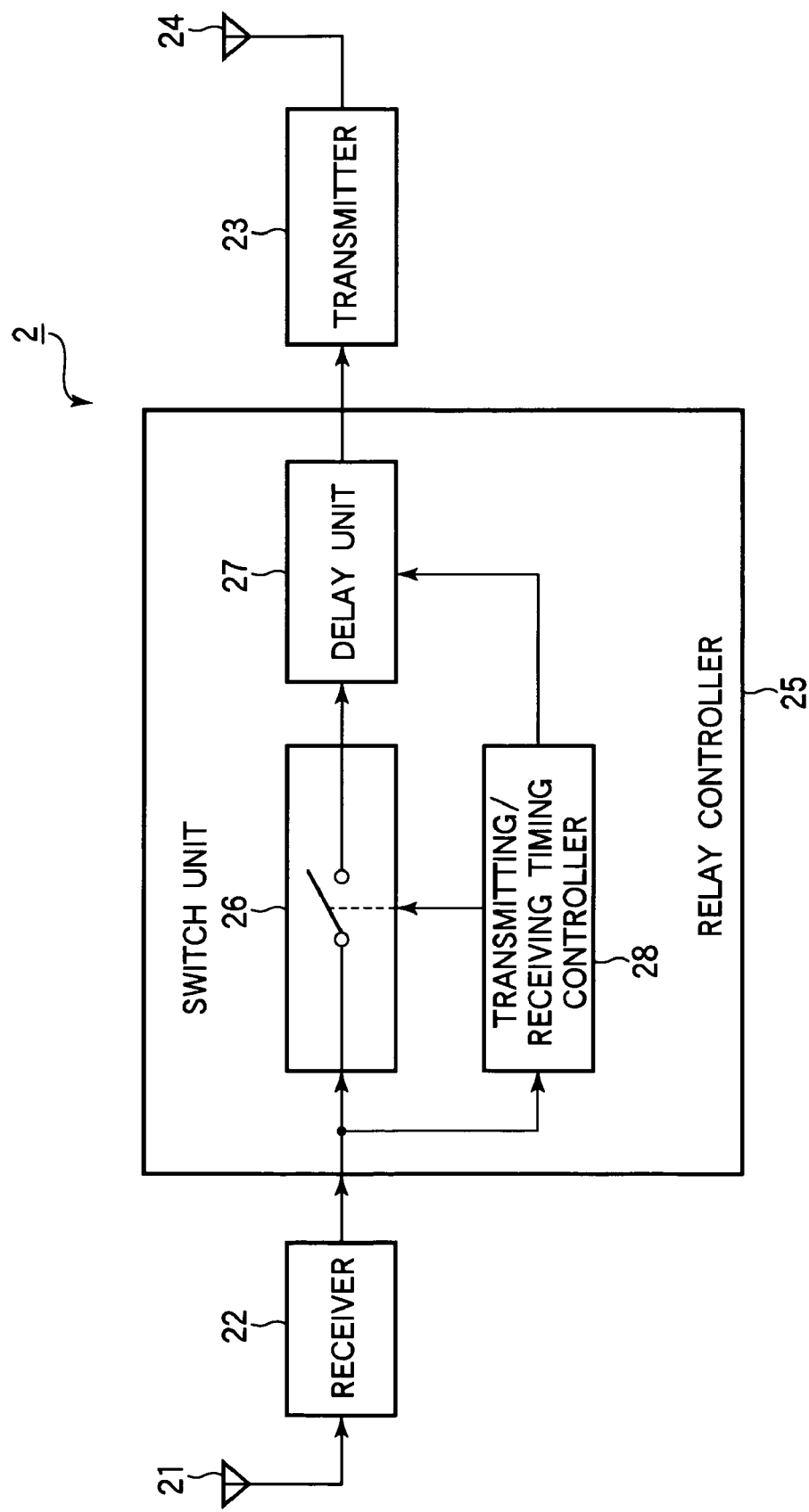
FIG. 4 is a block diagram of a UWB repeater according to a first embodiment of the invention.

Hereinafter, a detailed description is given of various embodiments of the invention with reference to the accompanying drawings.

FIG. 1 is a view showing the basic configuration (operating principle) of a UWB repeater according to the invention, and FIGS. 2(a) and 2(b) are views showing operations of the UWB repeater according to the invention, wherein FIG. 2(a) is a view showing the waveform of receiving signals, and FIG. 2(b) is a view showing a waveform of transmitting signals.

As shown in FIG. 1, a UWB repeater 1 includes a receiving antenna 11, a switching unit 12, a delay unit 13, an amplifier 14, and a transmitting antenna 15. UWB pulse signals received by the receiving antenna 11 are input into the delay unit 13 via the switching unit 12, and supplied to the amplifier 14 after being delayed for a predetermined period of time by the delay unit 13. The delayed pulse signals are power-amplified by the amplifier 14 and supplied to the transmitting antenna 15, wherein the signals are emitted from the transmitting antenna 15 as radio waves.

The switching unit 12 is controlled to be turned on (closed) while receiving pulse signals from a transmitter (not illustrated). Also, the switching unit 12 is controlled to be turned off (opened) while transmitting delayed pulse signals or until a predetermined period of time elapses from the moment when transmission of pulse signals ends.

As shown in FIGS. 2(a) and 2(b), in UWB, pulses for transmitting data are short pulses, and a large gap is provided between a pulse and the next pulse. Therefore, the UWB repeater 1 according to the invention receives pulse signals from a transmitter (not illustrated) but does not immediately amplify the pulse signals, and the UWB repeater 1 slightly delays the pulses, so that the pulses do not overlap the next pulse and further subsequent pulses, and radiates the pulses by the transmitting antenna 15 in air space after amplification. The UWB repeater 1 relays signals pulse by pulse so that it does not transmit a pulse while receiving the same and does not receive a pulse while amplifying and transmitting pulses.

FIG. 3 is a view showing operation of eliminating sneak path wave between the transmitting side and receiving side of the UWB repeater according to the invention. A repeater output UWB pulse that is an output of the UWB repeater 1 sneaks into the input side (that is, the receiving side). As a result, UWB pulses sneaked into the input side are produced. Sneak path wave characteristics shown in FIG. 3 include direct sneak path wave between respective antennas 11 and 15 and sneak path wave in a radio wave propagation channel (including a multi-path) in air space in which the UWB repeater 1 is installed.

The switching unit 12 is turned on for the timing when the UWB pulses are received from a transmitter (not illustrated), and is turned off for other timing. The UWB pulses from the transmitter (not illustrated) are delayed by the delay unit 13 so that the pulses do not overlap sneak path waves in terms of time. The switching unit 12 is turned off for the timing when the parts of UWB pulses are sneaked into the input side (receiving side). Therefore, there is no case where the sneaked UWB pulses are supplied into the amplifier 14, whereby only the UWB pulses from the transmitter (not illustrated) are delayed and relayed.

Operation for delaying and relaying the received pulse signals have points similar to those of above-described prior relaying in intermittent packets. However, the former differs from the latter in the following points:

(1) The UWB repeater cannot work in a case where a gap is provided between pulses as in UWB. In prior art intermittent packet communications, pulses are densely accumulated in a unit packet, and no gap is provided between pulses, wherein a large delay exceeding the packet length is required.

(2) In the UWB, a gap between pulses is in nanoseconds or so, wherein an adding delay is also at the level of nanoseconds. However, the delay in relay in general packet communications is at least milliseconds or so. Because the UWB repeater according to the invention is a pulse-by-pulse relaying system, the delay becomes much less than in the packet relay, wherein the delay unit may be accomplished even by, for example, a coaxial cable.

(3) Although the degree of delay is determined on the basis of the waveform of pulses in the invention, the degree of delay in the prior packet communications is determined on the basis of the packet length. The pulse waveform may widen according to the propagation path, wherein the amount of delay is established and the timing of the switch is determined with the spread of a waveform foreseen. In addition, because such a multiple access is considered, in which other pulses are involved between pulses of prescribed signals, it is necessary to adjust the delay so that the signals do not overlap the other pulses. It is not necessary to take either of them into consideration in the prior packet relay.

Further, in a UWB system radio transmission of several hundreds Mbps can be composed of a simple radio unit, and frequencies can be effectively utilized. However, because it requires a frequency bandwidth of several GHz or more, there is a concern that the frequencies thereof interfere with those of conventional wave users. Therefore, the transmission power of the UWB is severely limited, and the outreach of radio waves is also limited. The relay system is available as a system for alleviating such limitations. However, it is difficult to apply various types of repeaters conventionally used to UWB. Because the invention is constructed to enable pulse-by-pulse delay relaying, the following advantages exist.

(a) In radio homelinks, there are many cases where stream data such as pictures and music are transmitted. The MMAC (Multimedia Mobile Access Communication Systems Promotion Council) regulated Wireless 1394 standards as standards for radio homelinks in March, 2001, which are favorable for such transmissions. Since the stream data are not intermittent but naturally continuous, prior art packet relay systems bring large delays due to relays even if the relaying system is available, utilizing advantages of intermittent packet communications. To the contrary, the present invention is extremely favorable for relaying stream data, and the amount of delay is slight.

(b) A frequency-converting system such as a telephone network relay and TV broadcasting wave relay is available as a relay system in which delay is slight. However, that utilizes many frequencies which are apt to become short, UWB is a very wide band transmission system, in which the frequency conversion for relay is from microwaves to sub-millimeter waves or millimeter waves, and the structure of the repeater becomes complicated and the production cost thereof becomes high. In addition, the frequencies cannot be effectively utilized. However, the present invention utilizes the same frequency in UWB in all cases, the structure of the repeater can be made simple, and the delay is slight.

FIG. 4 is a block diagram of a UWB repeater according to a first embodiment of the invention. The UWB repeater 2 shown in FIG. 4 includes a receiving antenna 21, a receiver 22, a transmitter 23, a transmitting antenna 24, and a relay controller 25. The relay controller 25 is provided with a switching unit 26, a delay unit 27 and a transmitting/receiving timing controller 28.

The receiving antenna 21 receives UWB radio signals from a transmitter (not illustrated). Signals received by the receiving antenna 21 are supplied to the receiver 22. The receiver 22 is provided with a bandpass filter, a low-noise amplifier, correlator (matched filter), and an output amplifier, etc. The receiver 22 demodulates the signals received by the receiving antenna 21 and outputs received signals (pulse signals). The received signals (pulse signals) are output by the receiver 22 and supplied to the delay unit 27 via the switching unit 26 and at the same time, are supplied to the transmitting/receiving timing controller 28.

The transmitting/receiving timing controller 28 monitors the outputs of the receiver 22 when the switching unit 26 is opened, and grasps the timing (receiving timing), that is, period and phase, for which UWB pulses are output from a transmitter (not illustrated).

The transmitting/receiving timing controller 28 establishes the delay time of the delay unit 27 so that the timing (transmitting timing) of transmitting the received and relayed pulse signals does not overlap the receiving timing. Also, where the period of received signals is already known, it is possible to determine the delay time in advance.

When the receiving timing is detected, the transmitting/receiving timing controller 28 controls to cause the switching unit 26 to be turned on (closed) only in the receiving timing period and controls to cause the switching unit 26 to be turned off (opened) in the other period of time, whereby UWB pulses from a transmitter (not illustrated) are supplied to the delay unit 27 via the switching unit 26. The UWB pulses supplied to the delay unit 27 are delayed by a predetermined period of time by the delay unit 27 and are supplied to the transmitter 23.

The transmitter 23 amplifies the power of the delayed UWB pulses, supplies them to the transmitting antenna 24 and radiates the pulses from the transmitting antenna 24 as radio waves. Since the switching unit 26 is turned off (opened) during the period of transmitting the relayed pulses, the transmitted signals are not sneaked into the delay unit 27 via the receiver 22.

Further, in FIG. 4, such a configuration is shown, in which the receiving antenna 21 and transmitting antenna 24 are provided, respectively. However, a single antenna may be constructed so that transmitting and receiving can be carried out by providing an antenna multicoupler and an antenna switch portion.

Figure 5:
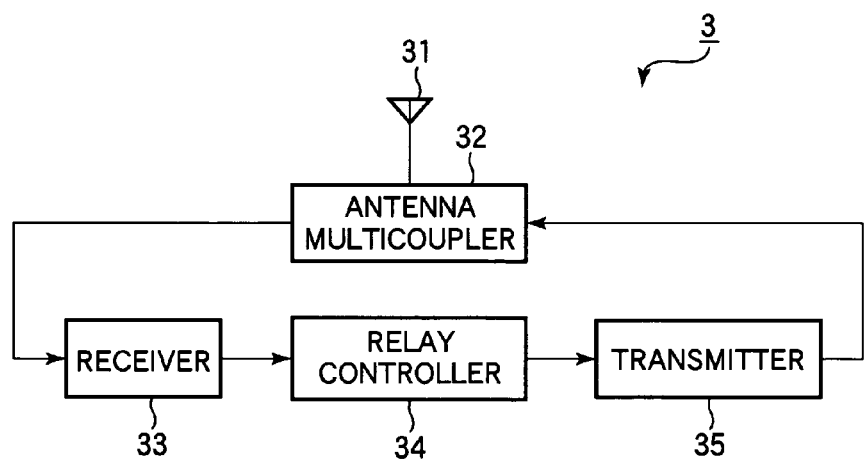
FIG. 5 is a block diagram of a UWB repeater according to a second embodiment of the invention.

FIG. 5 is a block diagram of a UWB repeater according to a second embodiment of the invention. A UWB repeater 3 shown in FIG. 5 includes a transmitting/receiving antenna 31, an antenna multicoupler 32, a receiver 33, a relay controller 34 and a transmitter 35.

UWB signals received by the transmitting/receiving antenna 31 are supplied to the receiver 33 via the antenna multicoupler 32. The receiver 33 includes a bandpass filter, a low-noise amplifier, a correlator, and a demodulator, etc. The receiving portion 33 demodulates the received UWB signals and generates a demodulated output (codes, etc., corresponding to logic 0 and 1).

The relay controller 34 is configured by using a microcomputer. The relay controller 34 provisionally stores the demodulated output of the receiver 33, and at the same time, detects a receiving timing of the UWB signals on the basis of the timing for which the modulated output is supplied. When the relay controller 34 detects the receiving timing of the UWB pulses from a transmitter (not illustrated), the relay controller 34 establishes transmitting timing so that the transmitting timing does not overlap the receiving timing. And the relay controller 34 further supplies the provisionally stored demodulated output to the transmitter 35 at the transmitting timing established.

The transmitter 35 is provided with a UWB pulse generator. The transmitter 35 generates UWB pulses corresponding to the demodulated output supplied from the relay controller 34. The UWB pulses generated in the transmitter 35 are supplied to the transmitting/receiving antenna 31 via the antenna multicoupler 32 and are emitted from the transmitting/receiving antenna 31 as radio waves.

The relay controller 34 handles the demodulated output, which is output from the receiver 22 during the receiving timing period, as a valid one, and handles the demodulated output except the receiving timing period as an invalid one. Therefore, even if the UWB pulses transmitted from the transmitter 35 are sneaked into the receiver 33, there is no case where the sneak path signals will be relayed again.

Further, FIG. 5 shows a configuration using the transmitting/receiving antenna 31. However, it may be configured that a receiving antenna and a transmitting antenna are provided, respectively. In this case, the antenna multicoupler 32 is no longer required.

Figure 6:
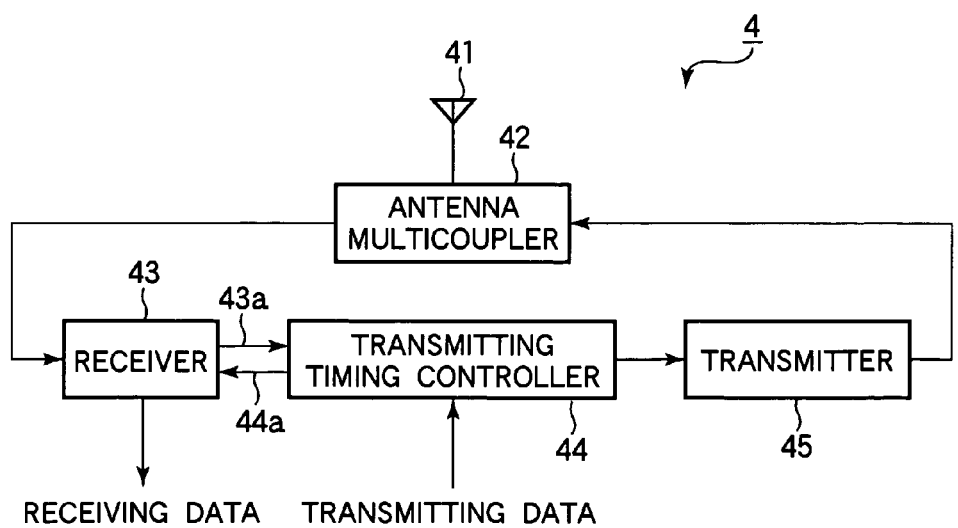
FIG. 6 is a block diagram of a UWB communication system according to a third embodiment of the invention.
Figure 7:
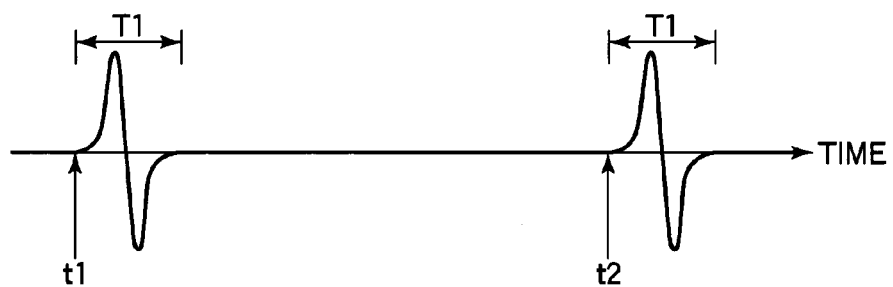
FIG. 7 is a view showing an example of a pulse waveform of UWB.
Figure 8:
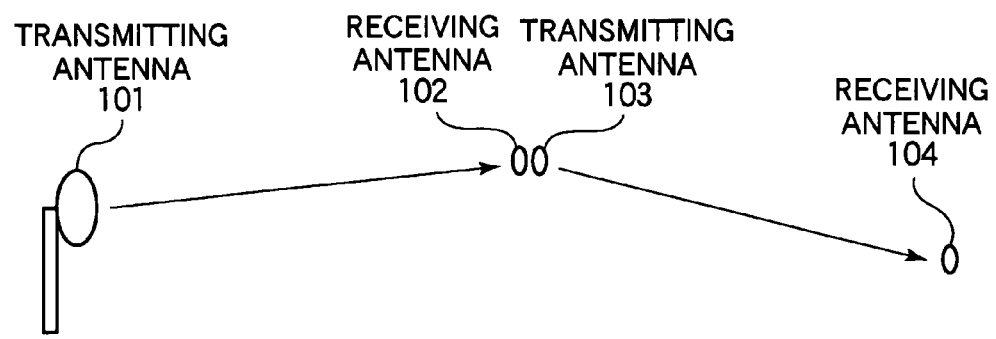
FIG. 8 is a view showing the concept of relay.
Figure 9:
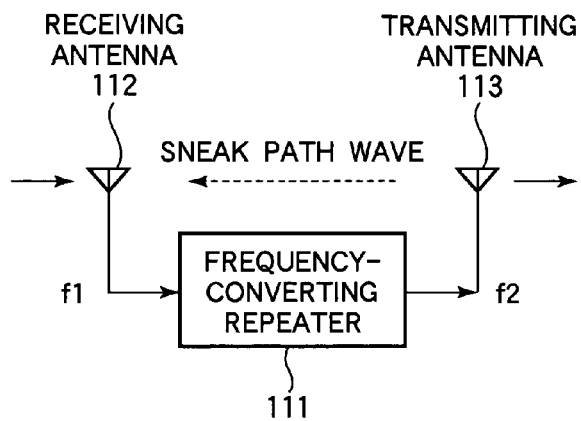
FIG. 9 is a view showing a frequency-converting repeater.
Figure 10:
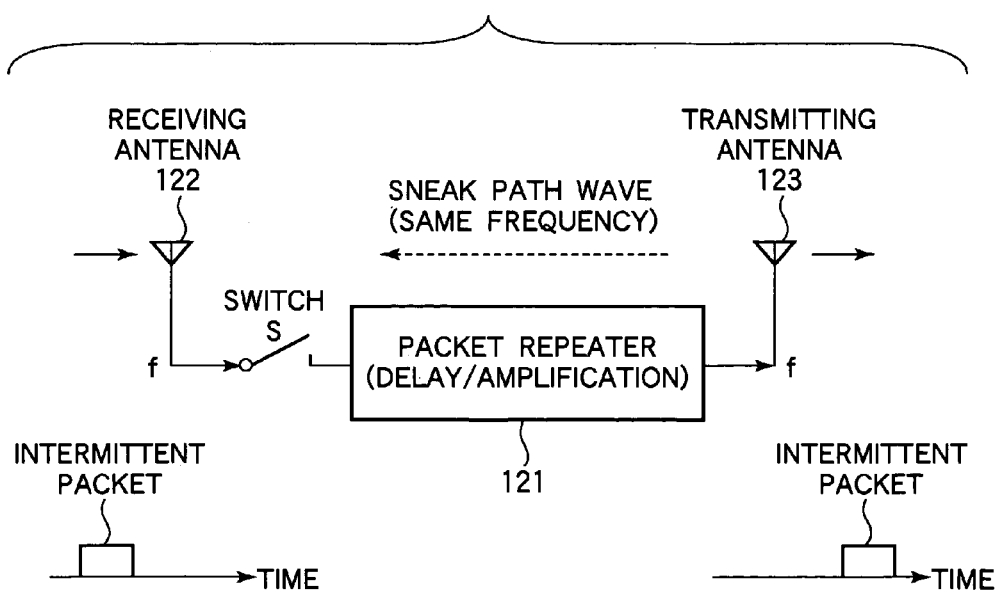
FIG. 10 is a view showing a packet repeater.
Figure 11:
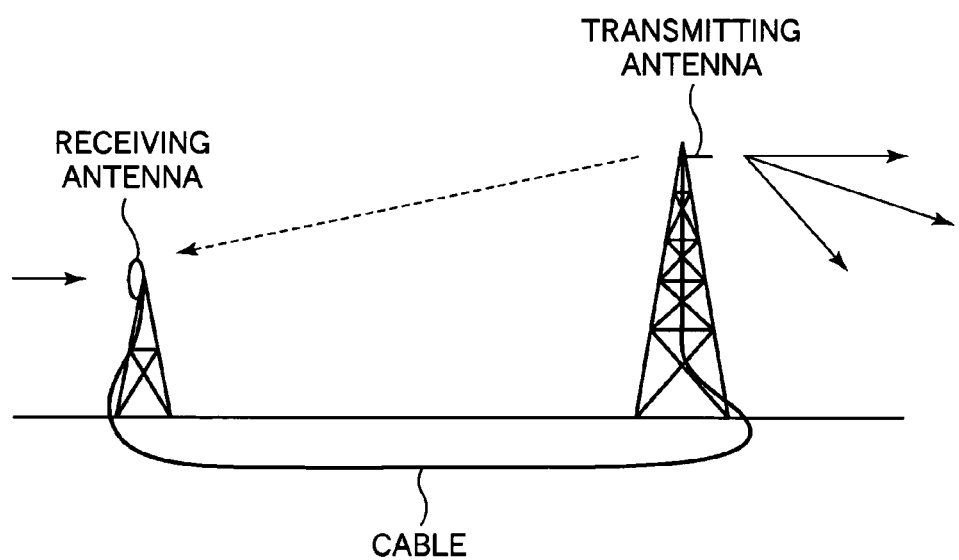
FIG. 11 is a view showing an SFN repeater.

FIG. 6 is a block diagram of a UWB communication system according to a third embodiment of the invention. A UWB communication system 4 shown in FIG. 6 carries out bi-directional data communications. The UWB communication system 4 includes a transmitting/receiving antenna 41, an antenna multicoupler 42, a receiver 43, a transmitting timing controller 44, and a transmitter 45.

UWB signals received by the transmitting/receiving antenna 41 are supplied to the receiver 43 via the antenna multicoupler 42. The receiver 43 is provided with a bandpass filter, a low-noise amplifier, a corrector, and a demodulator, etc. When the receiver 43 receives UWB pulse signals, the receiver 43 outputs a pulse detection signal 43a, and simultaneously outputs receiving data after demodulating the received pulse signals. The pulse detection signal 43a is supplied to the transmitting timing controller 44.

The transmitting timing controller 44 is configured by using a microcomputer system, etc. The transmitting timing controller 44 grasps the receiving timing and receiving period of pulses on the basis of the pulse detection signal 43a and establishes the transmitting timing between receiving pulses. The transmitting timing controller 44 is provided with a transmitting data buffer in which transmitting data are provisionally stored. The transmitting data stored in the transmitting data buffer are supplied to the transmitter 45 in synchronization with the transmitting timing.

The transmitter 45 includes a UWB pulse signal generator. The transmitter 45 generates UWB pulse signals corresponding to the transmitting data supplied via the transmitting timing controller 44. The UWB pulse signals generated by the transmitter 45 are supplied to the transmitting/receiving antenna 41 via the antenna multicoupler 42 and are emitted from the transmitting/receiving antenna 41 as radio waves.

The transmitting timing controller 44 supplies a transmitting timing signal 44a, which instructs "during the period of transmission," to the receiver 43. The receiver 43 handles, as invalid signals, the UWB pulse signals received during the period of transmitting timing, and does not carry out any detection and demodulation of pulse signals.

When the transmitting timing controller 44 commences transmission in a state where no receiving is performed, the transmitting timing controller 44 optionally establishes the transmitting timing and commences transmission.

As described above, the UWB communication system 4 according to the invention carries out time division with respect to receiving and transmission of pulses. Therefore, it is possible to solve interference between transmitting signals and receiving signals, wherein a UWB communication system capable of executing bi-directional communications in the TDD system (that is, Time Division Duplex system) can be realized with a simplified structure.

Further, the present invention is not limited to the above-described embodiments.

For example, it is preferred that the switch unit is turned on for the timing of receiving. However, in such a type in which the switch unit is turned off for the timing of transmission, a considerable effect can be brought about, by which sneak path signals can be prevented. In summary, it is sufficient that the timings in regard to pulse transmission and pulse receiving can be controlled pulse by pulse so that there is no case where pulses transmitted by the transmitter are received by the receiver, circulated to the transmitter and transmitted again therefrom.

Also, it is not necessary that the switch unit 12, delay unit 13 and amplifier 14, which are shown in FIG. 1, are disposed in this order. Any arrangement may be acceptable as long as these components are connected to each other in series. However, since there is a fear that the amplifier 14 is saturated by sneak path signals if the signals are great, it is preferable that the amplifier 14 is disposed behind the switch portion 12. Similarly, the switch unit 26 and delay unit 27 shown in FIG. 4 may be inversely disposed.

As described above, a UWB repeater according to the invention can prevent sneak path wave from the transmitting side to the receiving side by means of a simple structure such as a switch circuit, etc. Also, the delay due to relay can be remarkably decreased. Therefore, the UWB repeater according to the invention is preferable in relaying of stream data.

The UWB communication system according to the invention can resolve sneak path wave between the transmitting side and the receiving side, and can realize a UWB communication system, capable of carrying out bi-directional communications, with a simplified structure.

What is claimed is:

1. A UWB repeater comprising:
    a receiver for receiving UWB pulse series signals;
    a transmitter for transmitting UWB pulse series signals; and
    a relay controller arranged between said receiver and transmitter for transmitting pulse series signals, which are received by said receiver, said relay controller detecting receive timing of the UWB pulse series signals and establishing transmit timing so that the transmit timing does not overlap the receiving timing signals, said relay controller transmitting said pulse series signals at a predetermined transmitting timing which is different from the receiving timing by a pulse unit in order to prevent a sneak path wave between the receiver and the transmitter.

2. The UWB repeater as set forth in claim 1, wherein said relay controller includes a delay unit that delays pulse series signals received by said receiver.

3. The UWB repeater as set forth in claim 1, wherein said relay controller deactivates the receiving feature of said receiver for said transmitting timing or causes output of the receiver not to be supplied to the transmitter.

4. A UWB repeater communication system comprising:
    a receiver for receiving UWB pulse series signals and receiving data;
    a transmitter for transmitting UWB pulse series signals and transmitting data; and
    a transmitting timing controller arranged between said receiver and transmitter for detecting receive timing of the UWB pulse series and setting transmitting timing of pulse series signals in said transmitter to a predetermined timing which is different from the receiving timing of pulse series signals in said receiver by a pulse unit in order to prevent a sneak path wave between the receiver and the transmitter and such that the transit timing does not overlap the receive timing signals.

* * * * *